(12) United States Patent
Namuduri et al.

(10) Patent No.: US 9,481,357 B2
(45) Date of Patent: Nov. 1, 2016

(54) HYBRID POWERTRAIN WITH MECHATRONIC ACTUATOR ASSEMBLY AND METHOD OF CONTROLLING THE SAME

(71) Applicant: GM GLOBAL TECHNOLOGY OPERATIONS LLC, Detroit, MI (US)

(72) Inventors: Chandra S. Namuduri, Troy, MI (US); Alexandru Rajala, Farmington Hills, MI (US); Alan G. Holmes, Clarkston, MI (US); Thomas Wolfgang Nehl, Shelby Township, MI (US); Venkata Prasad Atluri, Farmington Hills, MI (US); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 135 days.

(21) Appl. No.: 14/585,658

(22) Filed: Dec. 30, 2014

(65) Prior Publication Data
US 2016/0185335 A1 Jun. 30, 2016

(51) Int. Cl.
| | |
|---|---|
| *B60W 20/00* | (2016.01) |
| *F16H 7/08* | (2006.01) |
| *F16H 19/02* | (2006.01) |
| *B60W 10/08* | (2006.01) |
| *B60W 10/11* | (2012.01) |
| *B60W 10/02* | (2006.01) |
| *B60K 6/36* | (2007.10) |
| *B60K 6/387* | (2007.10) |
| *B60K 6/44* | (2007.10) |

(52) U.S. Cl.
CPC ............... *B60W 20/10* (2013.01); *B60K 6/36* (2013.01); *B60K 6/387* (2013.01); *B60K 6/44* (2013.01); *B60W 10/02* (2013.01); *B60W 10/08* (2013.01); *B60W 10/11* (2013.01); *B60W 20/30* (2013.01); *F16H 7/0827* (2013.01); *F16H 19/02* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 7,826,939 | B2 * | 11/2010 | Liu | B60K 6/48 290/45 |
| 8,290,653 | B2 * | 10/2012 | Hofbauer | B60K 5/08 701/22 |
| 9,108,633 | B1 * | 8/2015 | Atluri | B60W 20/10 |
| 2013/0066492 | A1 * | 3/2013 | Holmes | B60W 20/00 701/22 |

(Continued)

*Primary Examiner* — Jonathan M Dager
(74) *Attorney, Agent, or Firm* — Quinn Law Group, PLLC (57) ABSTRACT

A powertrain includes an engine with a crankshaft rotating on a first axis, motor/generator unit (MGU), belted drive system, transmission, actuator assembly, and controller. An MGU rotor shaft rotates about a second axis. The belted drive assembly has a first pulley connected to the crankshaft, a second pulley selectively connected to the rotor shaft, and an endless rotatable drive element that connects the pulleys. The transmission is connected to the flywheel via an input clutch. The actuator assembly has a third axis parallel to the first and second axes, a linear actuator(s), pinion gears translatable along the third axis to selectively engage the first and second gear elements, and overrunning clutches to passively disengage the pinion gears from the first or second gear element. The controller transmits control signals to the MGU and linear actuators to command a control state via translation of the pinion gears.

20 Claims, 4 Drawing Sheets

(56) References Cited

U.S. PATENT DOCUMENTS

| | | | |
|---|---|---|---|
| 2014/0121867 A1* | 5/2014 | Tamai | B60W 10/06 701/22 |
| 2014/0228168 A1* | 8/2014 | Kaufman | B60W 20/20 477/5 |
| 2015/0258946 A1* | 9/2015 | Namuduri | B60K 6/40 307/10.1 |
| 2015/0258984 A1* | 9/2015 | Atluri | B60W 10/06 701/22 |
| 2016/0009268 A1* | 1/2016 | Tamai | B60W 10/08 701/22 |

\* cited by examiner

HYBRID POWERTRAIN WITH MECHATRONIC ACTUATOR ASSEMBLY AND METHOD OF CONTROLLING THE SAME

TECHNICAL FIELD

The present disclosure pertains to a hybrid powertrain with a mechatronic actuator assembly and a method of controlling the same.

BACKGROUND

Hybrid powertrains include an internal combustion engine and one or more electric machines. A controller is programmed to automatically vary use of the engine and the electric machine(s) during different vehicle conditions in order to select an optimal powertrain operating mode. Some hybrid powertrain designs use dual electric motor-based systems for engine start/stop functionality and onboard power regeneration. For example, a conventional 12 VDC auxiliary starter motor may be used to provide geared engine start/stop control while use of a high-voltage or an auxiliary voltage belted alternator-starter (BAS) system enables one of the electric machines to assist engine torque or recharge one or more batteries.

SUMMARY

A mechanical/electrical or "mechatronic" actuator assembly having one or more linear actuators is disclosed herein. The actuator assembly may be used in lieu of the dual electric motor-based systems noted above. As is known in the art, conventional 12-15 VDC auxiliary starter motors draw a relatively high amount of electrical current during engine cranking, which in turn can cause battery voltage to temporarily sag. Additionally, such auxiliary starter motors use a high gear ratio to achieve a required torque at the point of use, i.e., an engine flywheel. As a result, the auxiliary starter motor may reflect a sufficiently high amount of inertia such that engine starting speed is limited. The disclosed design is intended to help address this and other possible performance concerns preparatory to and concurrent with an engine cranking and starting event. The actuator assembly described herein is also usable in other vehicular and non-vehicular applications, including any power or torque transmission applications requiring a reliable selective connection between two rotating gear elements arranged on different parallel axes. For illustrative consistency, a hybrid vehicle application will be described herein with reference to the various Figures without limiting the inventive scope solely to the particular designs described herein.

The actuator assembly, which in different example embodiments includes one or two linear actuators such as example solenoid devices, each having an internal return spring or other return mechanism, includes a pair of axially-translatable pinion gears. When used in conjunction with an auxiliary motor/generator unit (MGU) in the representative hybrid powertrain described herein, the translating pinion gears may be positioned off-axis with respect to an axis of rotation of a rotor shaft of the MGU. The linear actuators may be positioned either on-axis or off-axis with respect to the axis of translation of the pinion gears.

In another embodiment, two of the linear actuators may be coaxially arranged with respect to each other. The linear actuators are selectively energized to cause translation of one or more plungers of the linear actuators, with each of the plungers being operatively connected to drive trains of the actuator assembly, such as via a set of lever forks or other suitable mechanical linkages. The linear movement of the plungers is transferred via the lever forks to ultimately translate and partially rotate the pinion gears into direct engagement with a respective first and second gear element positioned external to the actuator assembly, e.g., a ring gear connected to an engine flywheel and a gear element driven by the MGU. Thus, in a typical engine start/stop embodiment, the engine flywheel may be selectively connected to the MGU to provide geared engine starting independently of any connection between an engine-driven pulley and the MGU in a BAS-type assisted start.

As part of the present design, passively engaged overrunning clutches allow the MGU to be automatically disconnected from the engine once the engine has started and is running at a speed in excess of a speed of the MGU. That is, each overrunning clutch automatically allows a respective one of the pinion gears to move axially away from and thus disengage their respective connection targets, i.e., the respective flywheel and MGU. Optionally, only one of the overrunning clutches may be used, such as on the flywheel side of the engine, with a return spring force from the internal return mechanism disengaging one of the pinion gears from the MGU.

In an optional off-axis, two-linear actuator design, both linear actuators may fire or actuate at the same time to simultaneously connect the actuator assembly to the flywheel and the MGU, or one linear actuator device may actuate prior to the other to pre-engage the engine or the MGU. The latter design may be desirable in the event of change-of-mind starts in which a driver or controller determines that vehicle operating parameters have changed sufficiently such that a restart of the engine is not immediately required.

In another example embodiment, a hybrid powertrain includes an engine, an MGU, a belted drive assembly, the actuator assembly, a transmission, and a controller. The engine includes a crankshaft, a flywheel connected to and rotatable via the crankshaft, and a first gear element that rotates in conjunction with the flywheel about a first axis. The MGU includes a rotor shaft that is rotatable about a second axis that is parallel to the first axis, and also includes a second gear element connected to one end of the rotor shaft which has a controllable coupling element connected to its other end. A selective coupling device such as an electromagnetic clutch is disposed between the crankshaft and the MGU. The belted drive assembly has a first pulley connected to the crankshaft, a second pulley connected to the rotor shaft, and an endless rotatable drive element that connects the first and second pulleys to thereby deliver output torque from the MGU, i.e., motor torque, to the crankshaft when the selective coupling device is engaged. The transmission is operably connected to the flywheel/crankshaft via an input clutch.

The mechatronic actuator assembly in this embodiment, which is disposed between the first and second gear elements, has a third axis that is parallel to the first and second axes. The actuator assembly also has at least one linear actuator such as a solenoid device, motorized ball screw, or a shape memory alloy (SMA) actuator, and also includes a pair of pinion gears, and one or more passively engaged, one-way freewheeling or overrunning clutches. The pinion gears are translatable along the third axis to selectively engage a respective one of the first and second gear elements. Each overrunning clutch passively disengages one of the pinion gears from a respective one of the first or second gear element when a speed of the crankshaft exceeds a speed of the MGU. The controller is programmed to process control inputs to determine a control state of the actuator assembly, and to transmit control signals to the MGU and the linear actuator(s) to command execution of the determined control state, for instance engine cranking and starting, via translation of at least one of the pinion gears along the third axis.

A mechatronic actuator assembly is also disclosed for a system having first and second gear elements rotatable about respective first and second axes. The actuator assembly includes at least one linear actuator, a pair of pinion gears, and at least one overrunning clutch. The pinion gears are translatable along a third axis that is parallel to the first and second axes to selectively engage a respective one of the first and second gear elements. Each overrunning clutch is configured to passively disengage a respective one of the pinion gears from the first or second gear element when a speed of the first gear element exceeds a speed of the second gear element. When just one such clutch is used, e.g., at the flywheel side of the engine, a return mechanism of the linear actuator disengages from the MGU/second gear element.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

DETAILED DESCRIPTION

Figures 1, 2A:
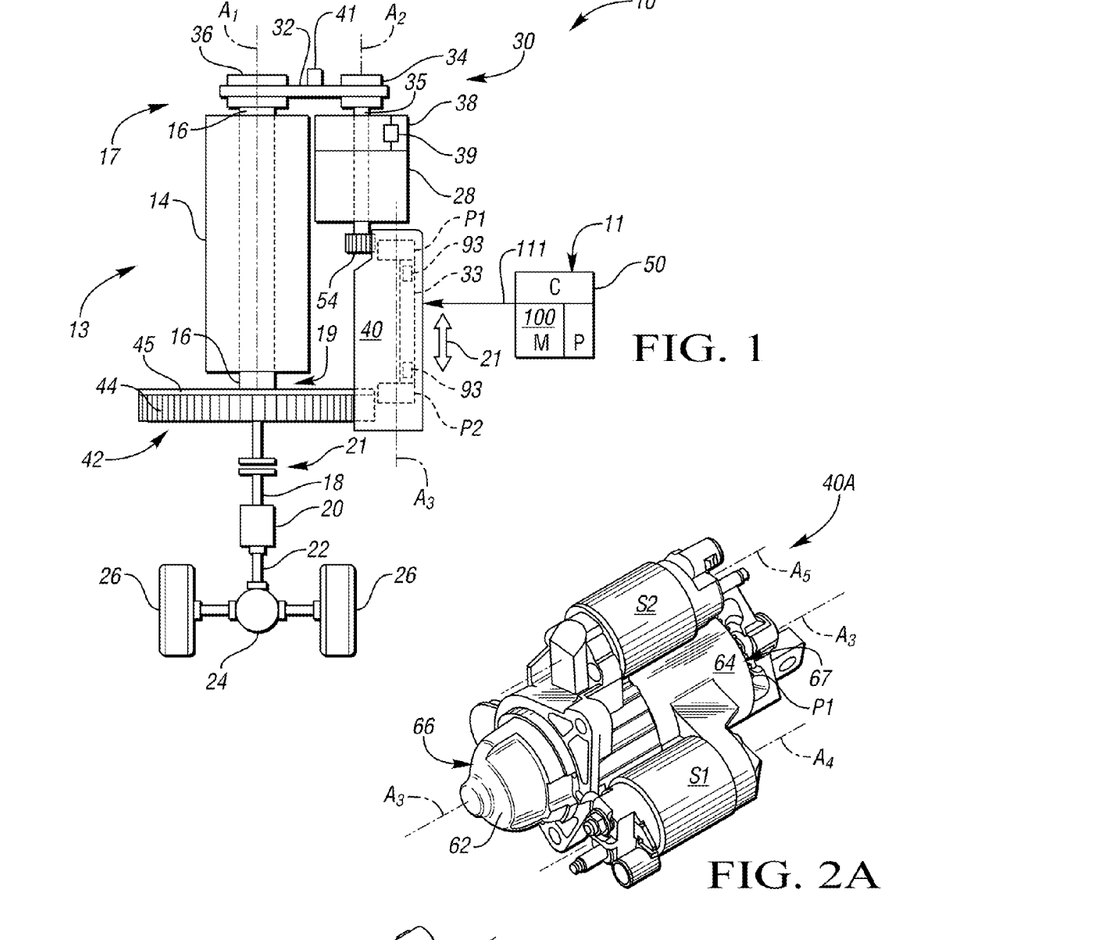
FIG. 1 is a schematic illustration of an auxiliary mechatronic actuator assembly used in an example hybrid powertrain.
FIGS. 2A and 2B are schematic perspective view illustrations of respective two- and one-linear actuator off-axis embodiments of the mechatronic actuator assembly shown in FIG. 1.

Referring to the Figures, wherein like numerals indicate like or corresponding parts throughout the several views, a mechatronic actuator assembly 40 is shown in FIGS. 1-6. FIG. 1 depicts the actuator assembly 40 in an example application aboard an example vehicle 10 having a hybrid powertrain 13. The hybrid powertrain 13 includes an internal combustion engine 14, a transmission 20, and a controller (C) 50. The engine 14 includes a flywheel 45 mounted to a rotatable crankshaft 16, both of which are rotatable about a first axis $A_1$. The crankshaft 16 may be selectively cranked or assisted as needed via a belted drive system 30, and therefore includes a belt-side 17 and a flywheel-side 19. Torque acting on the crankshaft 16 is selectively transmitted to an input member 18 of the transmission 20 via an input clutch 21, e.g., a friction clutch, a hydrodynamic torque converter, or a clutch and damper assembly as known in the art.

As explained below in further detail with reference to FIGS. 2A-6, the hybrid powertrain 13 of FIG. 1 includes an auxiliary electric machine in the form of a motor/generator unit (MGU) 28. As used herein, the term "auxiliary" refers to source power in the typical 10-15 VDC or 9-16 VDC voltage range used aboard modern motor vehicles. Such source power may be supplied via any suitable auxiliary power source (not shown), such as an auxiliary battery or an output of an auxiliary power module/voltage regulator. The MGU 28 is selectively coupled to the belt-side 17 of the engine 14 using a controllable selective coupling device 38, for instance an electromagnetic clutch, and/or to the flywheel-side 19 of the engine 14 via controlled operation of the actuator assembly 40. To control the state of the actuator assembly 40, the controller 50 generates and transmits control signals (arrow 111) in response to reception of a set of control inputs (arrow 11). By way of example, the control inputs (arrow 11) may include such values as vehicle speed, pedal force/travel information, ambient temperature, a temperature of the MGU 28, throttle level, on/off state of the engine 14, etc. The control signals (arrow 111) may be communicated to the actuator assembly 40 via a controller area network (CAN) bus or via any suitable wired or wireless transfer means.

The controller 50 of FIG. 1 may be embodied as one or more computer devices having a processor P and memory M, some of which is computer-readable tangible, non-transitory memory arranged on a printed circuit board or otherwise available to the processor P. Instructions embodying a method 100 may be programmed into memory M and executed as needed via the processor P to provide the control functionality over the state of the actuator assembly 40 as described herein. The memory M may include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, current/voltage/temperature/speed/position sensing circuitry, analog-to-digital (A/D) circuitry, digital-to-analog (D/A) circuitry, a digital signal processor, and any necessary input/output (I/O) devices and other signal conditioning and/or buffer circuitry.

The transmission 20 shown schematically in FIG. 1 may include a gear arrangement and clutches (not shown) through which torque flows from the input member 18 to an output member 22, through a final drive 24, and ultimately to drive wheels 26 to propel the vehicle 10. The drive wheels 26 shown may be front wheels or rear wheels, with only two drive wheels 26 shown in FIG. 1 for illustrative simplicity.

A second pair of wheels may also be powered by the powertrain 13 or may be unpowered without departing from the intended inventive scope.

The MGU 28 in the embodiment shown in FIG. 1 is controllable to function as a motor or as a generator as needed, and is operatively connectable to the crankshaft 16 via the belted drive system 30. The belted drive system 30 includes an endless rotatable drive element, hereinafter described as a belt 32 for simplicity, which engages with a first pulley 34 and a second pulley 36. When the first pulley 34 is connected to rotate in conjunction with the MGU 28, the belted drive system 30 establishes a driving connection between the MGU 28 and the crankshaft 16 via a selective coupling device 38 as part of a belted alternator-starter (BAS) system, as that term is well known and used in the art. Alternatively, the belted drive system 30 may include a chain or cog belt in lieu of the belt 32 and sprockets in lieu of the respective first and second pulleys 34 and 36. Both embodiments of the belted drive system 30 are referred to herein as a "belted drive train" for illustrative consistency.

The selective coupling device 38 as shown schematically in FIG. 1 selectively establishes a driving connection between the crankshaft 16 and the MGU 28 through the belted drive system 30. That is, an engagement of the selective coupling device 38, e.g., commanded via the controller 50 or another control device, delivers motor torque from the MGU 28 to the crankshaft 16. The selective coupling device 38 may be a normally engaged or normally open clutch, e.g., an electromagnetic clutch, which engages a rotor shaft 35 of MGU 28. The rotor shaft 35 rotates about a second axis $A_2$ in unison with the first pulley 34 when the MGU 28 is energized via a power supply (not shown), e.g., an auxiliary battery or an auxiliary output of an auxiliary power module.

An actuator 39 can be activated via commands from the controller 50 to selectively open or disengage the selective coupling device 38 such that the rotor shaft 35 is not in a driving connection with the crankshaft 16. The actuator 39 is characterized by a state at any given point in time, either an activated/energized or an inactivated state/de-energized state. The actuator 39 is further characterized by a respective actuation time, which is defined herein as the amount of time required to move the actuator 39 from a deactivated position to an activated position, or from the activated position to the deactivated position, and thus partially establish one of the operating modes of the hybrid powertrain 13 of FIG. 1.

Additionally, a variable tensioner system 41 as shown in FIG. 1 may be used to adjust the tension between the belt 32 and the respective first and second pulleys 34 and 36. The variable tensioner system 41 can be electronically, hydraulically, or otherwise actuated. By controlling the tension, the torque transferred between the belt 32 and the respective first and second pulleys 34 and 36, and thus between the MGU 28 and the crankshaft 16, can be automatically adjusted via operation of the controller 50. The tensioner system 41 can also be a passive tensioner that can automatically adjust the tension in both directions for motoring and generating modes of operation of the MGU 28.

With respect to the mechatronic actuator assembly 40 in particular, this device is controllable via operation of the controller 50 to selectively establish a driving connection between the MGU 28 and the flywheel-side 19 of the engine 14 and thereby enable a geared start of the engine 14. This occurs separately and independently from any connection between the MGU 28 and the belt-side 17 of the engine 14 achieved via the selective coupling device 38 for a BAS start. A gear train 42 disposed at the flywheel-side 19 of the engine 14 includes a first gear element 44, such as a ring gear, that is directly connected to the flywheel 45 such that the first gear element 44 rotates about the axis $A_1$ in conjunction with the crankshaft 16. A second gear element 54 is connected to rotor shaft 35 of the MGU 28 to rotate about axis $A_2$, with axes $A_1$ and $A_2$ being parallel to each other as shown in FIG. 1.

Figure 5:
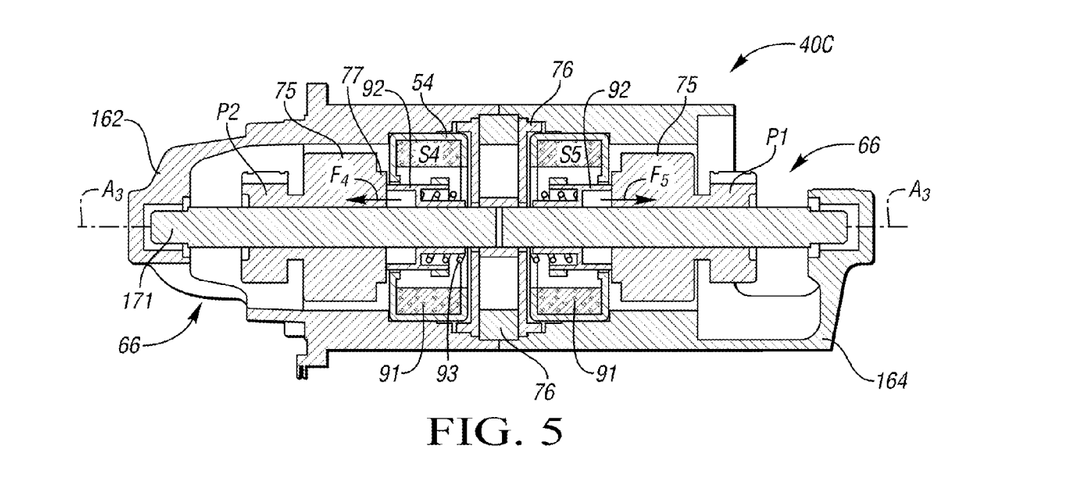
FIG. 5 is a schematic cross-sectional side view illustration of an alternative two-linear actuator on-axis embodiment of the mechatronic actuator assembly as shown in FIG. 1.

The actuator assembly 40 includes a pair of pinion gears P1 and P2. Each of the pinion gears P1 and P2 is axially translatable along an axis $A_3$ of the actuator assembly 40 in response to the control signals (arrow 111) from the controller 50. Translation or linear motion of the pinion gears P1 and P2 is provided via one or more linear actuators 33 and is indicated in FIG. 1 via double-headed arrow T. Each linear actuator 33 may include a return mechanism 93, e.g., a return spring as shown in the example of FIG. 5, as is well known in the art. When the linear actuator 33 is de-energized, the pinion gears P1 and P2 are held in the disengaged position by the return mechanism 93 with respect to the respective second and first gear elements 54 and 44.

Specifically, the pinion gear P2 is selectively movable between an engaged or coupled position with the first gear element 44 as shown, and therefore with the flywheel 45 and crankshaft 16, and an uncoupled or disengaged position so that the pinion gear P2 is not meshed with the first gear element 44.

Likewise, the pinion gear P1 is axially moveable between an engaged or coupled position with the second gear element 54 as shown, and therefore with the MGU 28, and an uncoupled or disengaged position as needed so that the additional pinion gear P2 is not meshed with the second gear element 54. This functionality, coupled with the dual motor/generator functionality of the MGU 28, enables the state of the actuator assembly 40 to be selected by the controller 50 to provide onboard power generation, BAS starts, or geared starts as needed with a single auxiliary MGU 28. Details of the actuator assembly 40 will now be described with reference to FIGS. 2A-6.

Figure 2B:
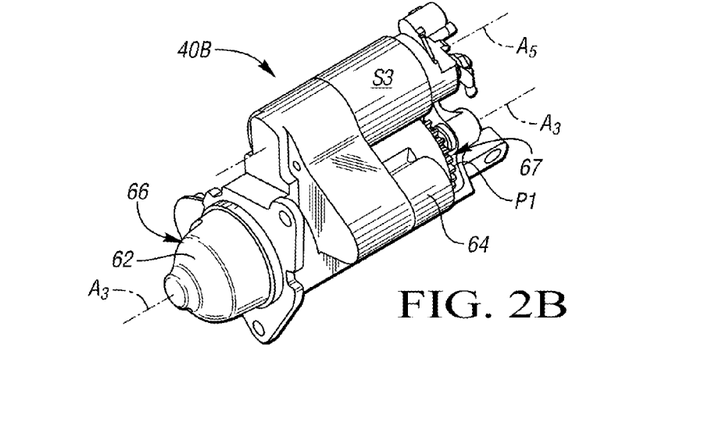

Referring to FIGS. 2A and 2B, two possible embodiments of the actuator assembly 40 introduced above with reference to FIG. 1 include respective dual- and single-linear actuator-based mechatronic actuator assemblies 40A and 40B. For illustrative simplicity and consistency, the linear actuators are described and shown in the various Figures as example solenoid devices. However, the linear actuator(s) 33 of FIG. 1 may be variously embodied as rotary ball screws, shape memory alloys, or the like without departing from the intended inventive scope.

Figure 3A:
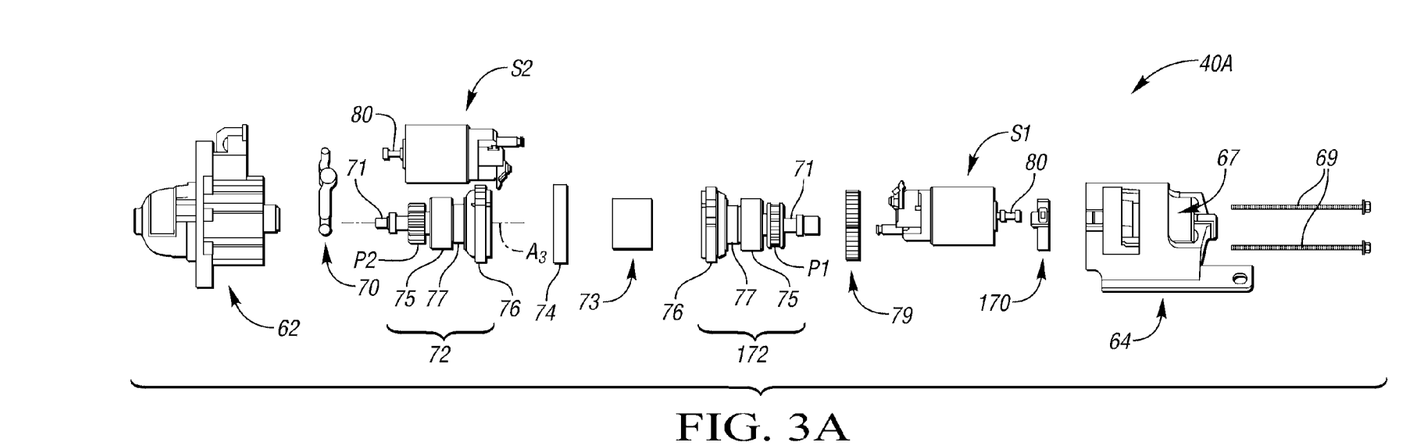
FIGS. 3A and 3B are schematic exploded view illustrations of the respective two-one-linear actuator off-axis embodiments of FIGS. 2A and 2B.

In the actuator assembly 40A of FIG. 2A, a first linear actuator such as a non-limiting example solenoid device S1 is arranged on an axis $A_4$, a second linear actuator in the form of an example solenoid device S2 is arranged on an axis $A_5$, and a flywheel shroud 62 and a starter housing 64 are connected together, such as via threaded fasteners or lag bolts 69 as shown in FIG. 3A. While omitted from FIGS. 2A and 2B for illustrative simplicity, the solenoid devices S1, S2, and S3 house or include the return mechanism 93 noted above with reference to FIG. 1, e.g., a return spring, which translates a movable member such as the plungers 80, 180 shown in FIGS. 3A and 3B when the solenoid device is no longer energized. In other words, energizing of the solenoid devices S1, S2, or S3 draws the plunger 80 or 180 in one axial direction into the solenoid device and the return mechanism 93, when the solenoid device S1, S2, or S3 is de-energized, translates the plunger 80 or 180 back in the opposite axial direction.

Figure 6:
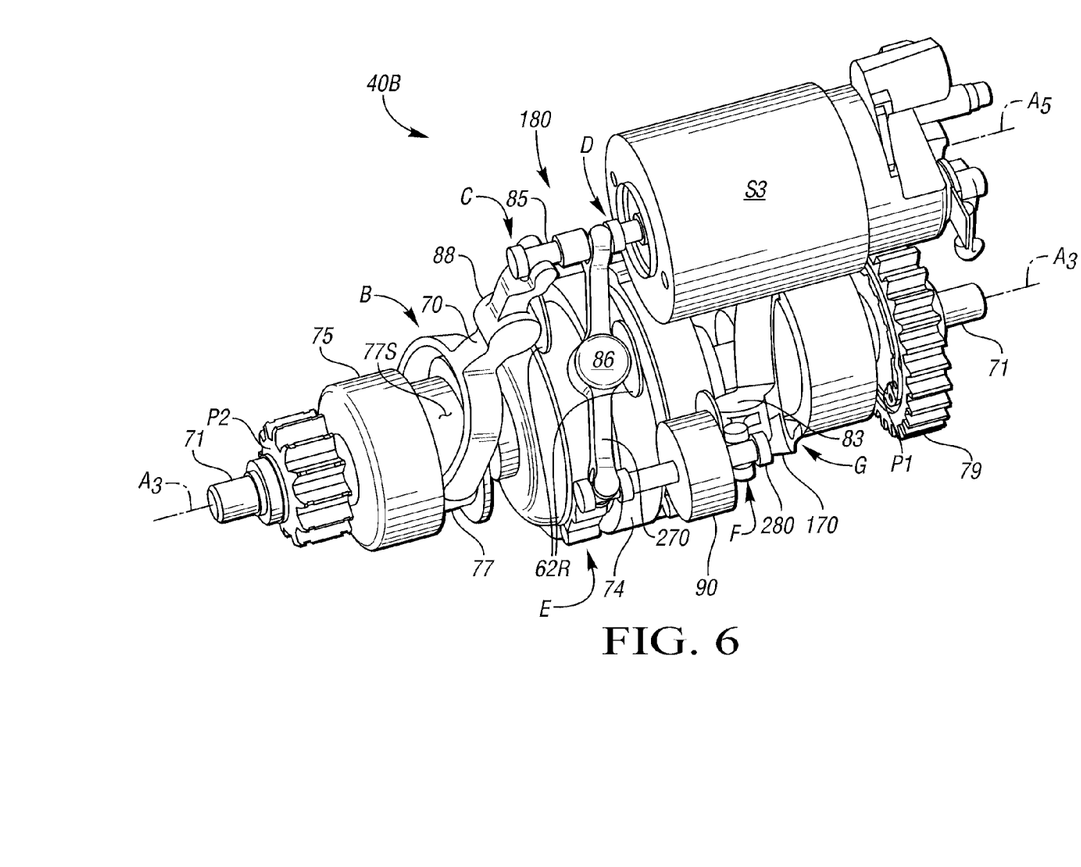
FIG. 6 is a schematic perspective view illustration of the single-linear actuator off-axis design of FIG. 3B.

The flywheel shroud 62 and starter housing 64, which may be constructed of steel, cast iron, aluminum, or other suitable material and bolted together to form an integrated or single unit, when bolted or otherwise joined together encapsulate and protect any internal components of the actuator assemblies 40A and 40B from debris during operation. The axes $A_4$ and $A_5$ may be substantially parallel to each other and to axis $A_3$ in some embodiments, i.e., arranged "off-axis" with respect to the axis $A_3$. A set of mechanical linkages in the form of lever forks are used to transfer torque within the actuator assemblies 40A and 40B as best shown in FIGS. 3A, 3B, and 6 as discussed below with reference to those Figures.

The flywheel shroud 62 has an open side 66 that is not fully visible from the perspective of FIGS. 2A and 2B. The open side 66 is a cutaway section of the flywheel shroud 62 that exposes the pinion gear P2 (not shown) of the actuator assemblies 40A and 40B so that meshing engagement is possible with the first gear element 44 on the flywheel 45 as shown in FIG. 1. Thus, the open side 66 forms the "engine side" of the actuator assemblies 40A and 40B. Likewise, the starter housing 64 has an open side 67 that exposes the pinion gear P1 in proximity to the second gear element 54 of the MGU 28 shown in FIG. 1, i.e., the "motor side" of the actuator assemblies 40A and 40B. The single-actuator design of the actuator assembly 40B of FIG. 2B uses a single linear actuator, e.g., the solenoid S3, on axis $A_5$ is used in lieu of the example solenoid devices S1 and S2 of FIG. 2A. Regardless of the number of linear actuators that are used, selective engagement is provided of the engine 14 of FIG. 1 with the MGU 28 at the flywheel side 19 independent of any connection occurring between the engine 14 and the MGU 28 at the belt-side 17.

Figure 3B:
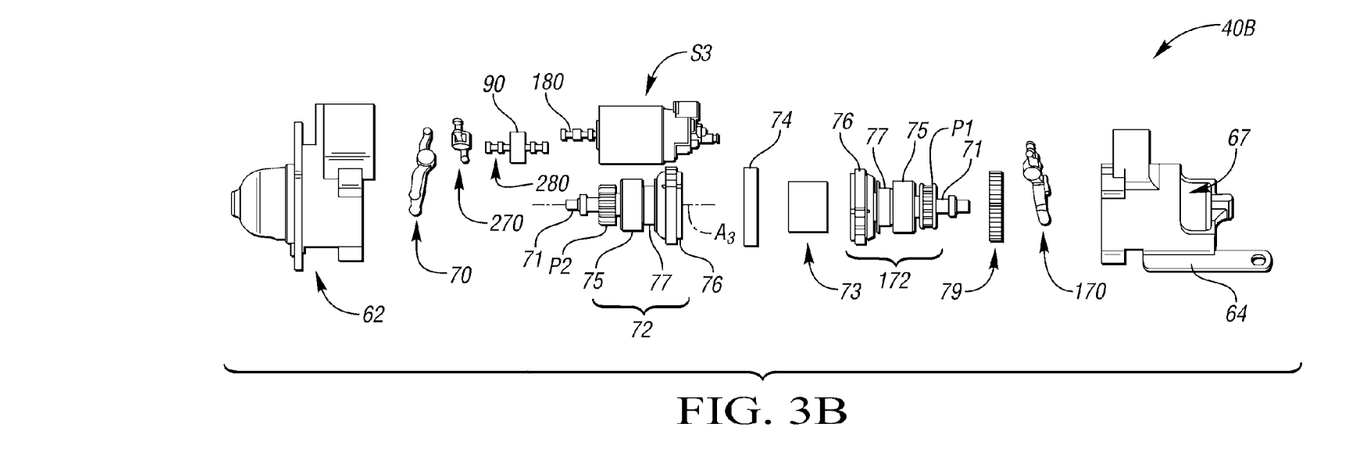

Schematic exploded view illustrations of the actuator assemblies 40A and 40B of FIGS. 2A and 2B are shown in FIGS. 3A and 3B, respectively. The flywheel shroud 62 and the starter housing 64 at either end of the actuator assemblies 40A and 40B encapsulate the internal components of the actuator assemblies 40A and 40B as noted above. The internal elements include respective first and second drive trains 72 and 172 arranged along axis $A_3$ on a rotatable shaft 71. The first and second drive trains 72 and 172 may be identically configured but reversed in their axial orientations as shown. In other embodiments, the drive train 172 may be differently constructed, particularly with respect to an overrunning clutch 75 as explained below. The shaft 71 and any connected elements of the first and second drive trains 72 and 172 rotate about the axis $A_3$ whenever the first and second drive trains 72 and 172 are engaged with the second gear element 54 and driven through pinion gear P2 via the MGU 28 of FIG. 1.

Figure 4:
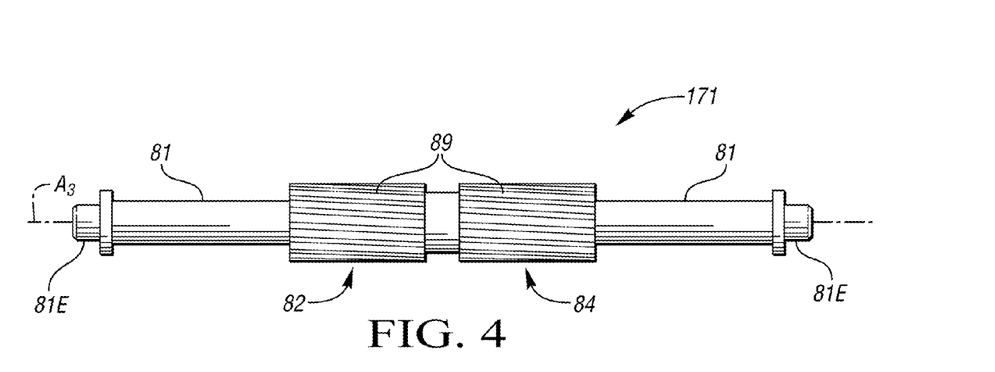
FIG. 4 is a schematic plan view of an optional unitary shaft design usable with the mechatronic actuator assembly shown in FIGS. 1-3B.

Referring briefly to FIG. 4, while the shaft 71 is shown in FIGS. 3A and 3B as two separate shaft pieces positioned end-to-end and coupled together via a coupler 73 and spacer 74, a single shaft 171 may be used in the alternative. In such an embodiment, the coupler 73 and spacer 74 of FIGS. 3A and 3B may be dispensed with. The shaft 171 of FIG. 4 may include raised shank portions 82, 84 each with external radially-projecting spiral splines or threads 89 as shown. A smooth shank portion 81 extends axially outward from each of the raised shank portions 82 and 84 toward a different distal end 81E of the shaft 171. While omitted for clarity from FIG. 4, guide elements 77 of FIGS. 3A and 3B discussed below are each internally-threaded to mate with the spiral threads 89 of the shaft 171 of FIG. 4 such that any translation of the pinion gears P1 and P2 along axis $A_3$ of the shaft 171 also results in finite rotation of the pinion gears P1 and P2 about axis $A_3$.

A purpose of the spiral threads 89 is to enable the pinion gears P1 and P2 to smoothly engage the first gear element 44 of the flywheel 45 and the second gear element 54 of the MGU 28 of FIG. 1 as the pinion gears P1 and P2 translate along the axis $A_3$. This is ensured via slight rotation of the pinion gears P1, P2 due to travel along the spiral threads 89, which may be configured to provide the desired degree of rotation to the pinion gears P1 and P2. Outside of the unitary design of the optional one-piece shaft 171 of FIG. 4, other design features are used in common with the split- or dual-shaft design of FIGS. 3A and 3B, including the raised shank portions 82 and 84, with a notable difference being in the use of a ring gear 76, or a planetary gear receptacle used as a coupler receptacle, the spacer 74, and the coupler 73 of FIGS. 3A and 3B to adapt two shafts 71 of the dual-shaft design for use as a substitute for the unitary shaft 171 of FIG. 4. As some of the components of FIGS. 3A and 3B may be available in a conventional starter motor, use of the split shaft 71 in lieu of the unitary shaft 171 of FIG. 4 may facilitate reuse of existing components.

With respect to the first drive train 72 of FIGS. 3A and 3B, this structure includes the pinion gear P2, an overrunning clutch 75, the optional ring gear 76 used for adapting a split or dual-shaft design so that it functions as a single shaft, and the internally-threaded guide element 77. The second drive train 172 may be substantially identically configured and oppositely orientated to mirror the first drive train 72, i.e., to face in the opposite direction along axis $A_3$. In an optional embodiment, the second drive train 172 may forego use of the overrunning clutch 75 while retaining the overrunning clutch 75 in the first drive train 72. Once the solenoid devices or other linear actuators are de-energized, built-in return spring force disengages the pinion gear P1 from the second gear element 54 so that the shaft 71 is not spinning when the engine 14 and/or the MGU 28 are spinning. When actuated by a respective one of the solenoid devices S2 or S1, the first and second drive trains 72 and 172 rotate and translate the respective pinion gears P2 and P1 along the axis $A_3$, with slight rotation being desirable to help align with and smoothly engage the first gear element 44 of FIG. 1 in the case of the pinion gear P2 and with the second gear element 54 of FIG. 1 in the case of the pinion gear P1.

The actuator assembly 40A includes first and second lever forks 70 and 170. The first and second lever forks 70 and 170 are configured as mechanical linkages which grasp or engage a linearly translatable plunger 80 of the respective solenoid devices S2 and S1. Axial motion of the plungers 80 along their respective axes $A_5$ and $A_4$ results from the connections provided by the first and second lever forks 70, 170 when the solenoid devices S2 or S1 are energized to apply axial forces to the gear trains 72 and 172 via the lever forks 70, 170. The flywheel shroud 62 and the starter housing 64 may be configured with stationary surfaces or landings providing a suitable surface for the first and second lever forks 70 and 170 to react against and to allow the desired forces to be transmitted to the first and second drive trains 72 and 172. The overall size and shape of the flywheel shroud 62 and the starter housing 64 may change from the schematic representations of the Figures to accommodate the different geometry of the various alternative embodiments described herein.

Possible connections of the first and second lever forks 70 and 170 are best shown in FIG. 6 and described separately below. In general, the respective first and second lever forks 70 and 170 may be embodied as molded plastic, composite material, or metal arms with forked ends which grasp and directly engage a cylindrical outer surface 77S (see FIG. 6) of the guide element 77, such that linear motion or translation of the plunger 180 along axis $A_5$ is transferred via a mechanical linkage provided by the first lever forks 70 into linear motion of the first drive train 72 along axis $A_3$, which in turn moves the pinion gear P2 into engagement with the first gear element 44 of the flywheel 45 as shown in FIG. 1. Likewise, movement of the plunger 80 of the solenoid device S1 ultimately results in similar rotation of the second lever fork 170 and causes translation of the pinion gear P1 along axis $A_5$ toward the starter housing 64, and thus into engagement with the second gear element 54 of the MGU 28 of FIG. 1.

FIG. 3B shows an exploded view of the alternative single-solenoid design of FIG. 2B. The internal details of FIG. 3B are, with a few notable exceptions, identical to those of FIG. 3A. For instance, the description of the respective first and second drive trains 72 and 172 as set forth above with reference to FIG. 3A applies to FIG. 3B. However, as only one linear actuator is used, i.e., the solenoid device S3, additional modifications are made to the first and second lever forks 70 and 170 to provide the required motion to the pinion gears P1 and P2.

More specifically, a third lever fork 270 is used in conjunction with the first lever fork 70 to provide the desired translation of the two pinion gears P1 and P2 via just one solenoid device S3. Additional changes to enable the single linear actuator design include providing a plunger 180 as shown in FIG. 6 with two landings or shoulders 85 instead of just one as in the FIG. 3A design, and including a free plunger 280, with the term "free" indicating that there are two free or distal ends of the plunger 280, while engaged by a different one of the lever forks 70, 170, or 270 as described herein, are not a moving part of the solenoid device S3 itself. Rather, the free plunger 280 is supported by and received within a guide feature 90 and used to transfer linear motion from the free plunger 280 to the second drive train 172 via the second lever fork 170.

Referring to FIG. 6, the single-solenoid design of the actuator assembly 40B shown in FIG. 3B is shown in perspective side view, with this view better illustrating the various connections of the first, second, and third lever forks 70, 170, and 270. Shafts 71 are arranged along axis $A_3$. Pinion gears P1 and P2 are disposed along axis $A_3$ on the shafts 71, with pinion gear P1 that is engageable with the second gear element 54 is nested within an optional outer larger gear element 79 to form a matched gear having the desired speed ratio at the MGU 28. The matched gear may also be a single gear without nesting the pinion gear P1 within the outer gear 79. Use of the nested design may enable reuse or repackaging of available starter motor gear components. The overrunning clutches 75 are disposed axially adjacent to the drive elements 77, with a respective axial surface 77S of the drive elements 77 forming a shoulder or landing engaged by the ends of the lever forks 70 and 170.

With respect to the first lever fork 70, this structure has two ends B and C each defining a two-pronged arcuate fork or gripper configured to engage the axial surface 77S and the shoulders 85, respectively. The first lever fork 70 has a pivot point 88 that reacts against a reaction surface 62R, e.g., of the flywheel shroud 62 of FIG. 3A. As solenoid device S3 pulls the plunger 180 into solenoid device S3, moving 180 toward pinion gear P1 in FIG. 6 moves the lower part of lever fork 70 to the left as viewing FIG. 6, thereby urging pinion gear P2 toward the flywheel 45 and the first gear element 44 of FIG. 1. Simultaneously, the bottom side of lever fork 270 moves to the left as plunger 280 moves toward the pinion gear P2, thereby causing the portion of fork end G of lever fork 170 to move right in FIG. 6, thus urging pinion gear P1 toward the second gear element 54 of FIG. 1. Note that each fork lever 70, 170, 270 of FIG. 6 inverts the motion around a pivot point, i.e., as one end of a fork moves one way the opposite end of the fork moves in the opposite direction. Thus, motion of end D of the plunger 180 of solenoid device S3 toward the pinion gear P2 or end E toward pinion gear P1 urges the pinion gear P2 toward the flywheel 45 of FIG. 1. At the same time, the third lever fork 270 engages the other shoulder 85 of the plunger 180 at an end D of the third lever fork 270, while an opposite end E engages a shoulder 85 of the free plunger 280.

A pivot point 86 of the third lever fork 270 reacts against another reaction surface 62R to urge the free plunger 280 toward the pinion gear P2. Another end of the free plunger 280 has a shoulder 85 engaged by an end F of the second lever fork 170, with an opposite end G engaged with the axial surface 77S of the other drive element 77. The guide member 90 forms a stationary portion of the flywheel shroud 62 or other structure and circumscribes, supports, and aligns the free plunger 280 as shown. The guide member 90 may also provide another reaction surface 62R for a pivot point 83 of the second lever fork 170. Therefore, axial motion of the plunger 180 of the solenoid device S3 results in translation of both of the pinion gears P1 and P2 towards their respective target engagement gear elements 54 and 44, respectively.

In the design of FIG. 6, a location of the pivot point 86 may be selected during the design stage of the actuator assembly 40B to control the timing of engagement with the engine 14 and MGU 28 of FIG. 1, effectively setting a calibrated link ratio. For instance, the third lever fork 270 may be balanced with respect to the pivot point 86 such that the pivot point is equidistant from ends D and E. This will ensure that motion of the plunger 180 simultaneously moves the pinion gears P1 and P2 to the same degree. In such an embodiment, the MGU 28 and engine 14 of FIG. 1 are simultaneously engaged by the respective pinion gears P1 and P2. An alternative design is possible in which the pivot point 86 is not equidistant, thereby allowing one pinion gear P1 or P2 to engage before the other. Benefits of such a design are noted above, such as allowing for "change of mind" starts by preloading the MGU 28 without actually starting the engine 14 or vice versa.

FIG. 5 depicts another actuator assembly 40C having a flywheel shroud 162 and providing an alternative coaxial or side-by-side embodiment of the two-solenoid design of FIGS. 2A and 3A. Solenoid devices S4 and S5 are arranged on the axis $A_3$ each adjacent one of the overrunning clutches 75 and drive elements 77 described above. Windings or coils 91 of the solenoid devices S4 and S5 are selectively energized via connection to an electrical source such as a battery or auxiliary power source (not shown), which in turn generates a magnetic field with respect to the coils 91. The magnetic field urges a magnetic plunger 92 into contact with the adjacent drive element 77 and overrunning clutch 75 with a respective axial force $F_4$ and $F_5$ along axis $A_3$, which in turn rotates and axially moves the pinion gear P1 or P2 into engagement with its target, i.e., the first gear element 44 or the second gear element 54 of FIG. 1, via the open side 66 noted above with reference to FIG. 1. Such a design may provide for more compact axial design of the overall mechatronic actuator assembly 40C.

The disclosed designs are all intended to enable use of a single auxiliary electric machine, i.e., the MGU 28 of FIG. 1, with geared starting of the engine 14 while retaining belt-driven energy generation capabilities via the belted-drive system 30. This eliminates the need for a separate auxiliary starter motor for cold cranking of the engine 14, a process which may be less than optimal in terms of noise, vibration, and harshness (NVH) and delayed starting speeds, particularly when attempted via a BAS system due such as the belted-drive system 30 due to possible low-temperature slippage of the belt 32 of FIG. 1.

Additionally, as the present solution includes driving the MGU 28 via regulated auxiliary voltage, any starting current and voltage sag is reduced relative to conventional 12 VDC starter motor-based cold cranking designs. In terms of NVH reduction, this result is made possible in part due to isolation of the actuator assembly 40 from both the flywheel 45 and the MGU 28 of FIG. 1 once the engine 14 has started and engine speed has surpassed a speed of the MGU 28, with such isolation provided via operation of the overrunning clutches 75 of FIGS. 3A, 3B, 5, and 6.

Figure 7:
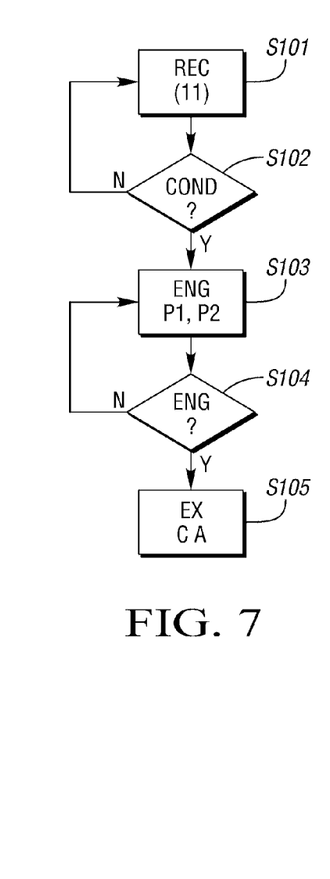
FIG. 7 is a flow chart describing an example method for controlling a state of the mechatronic actuator assembly shown in FIGS. 1-6.

Referring to FIG. 7, a method 100 may be executed via the controller 50 of FIG. 1 in the overall control of a geared system, such as the vehicle 10 of FIG. 1 in the example engine cranking and starting event. Beginning with step S101, after first connecting, positioning, or otherwise providing the actuator assembly 40 between the first gear element 44 and 54 of FIG. 1, The controller 50 receives the set of control inputs (arrow 11), for instance vehicle speed, pedal position/travel/force, battery state, ambient temperature, a present or expected operating state of the powertrain 13, a temperature of the MGU 28, throttle level, on/off state of the engine 14, an ignition on/off position, or any other suitable inputs necessary for determining if operation of the actuator assembly 40 is required. Each control input (arrow 11) may be detected or measured by existing onboard sensors (not shown), e.g., thermocouples, engine 14 or transmission 20 input/output speed sensors, position switches, and the like, or the controller 50 may be informed of such control inputs (arrow 11) by other controllers (not shown) such as an engine control module, a transmission control module, a hybrid control module, or the like, as is well known in the art. The method 100 proceeds to step S102 once the control inputs (arrow 11) have been received.

Step S102 entails determining, via the controller 50, whether the received set of control inputs (arrow 11) meets a predetermined condition (COND) indicative of a required state of the powertrain 13 of FIG. 1. One such condition could be a requested engine cranking and starting of the engine 14 in either a belt-assisted start via the first and second pulleys 34 and 36 of FIG. 1 and the second gear element 54, or a geared start of the engine 14 via the first gear element 44. That is, when the control inputs (arrow 11) correspond to a need to start the engine 14 of FIG. 1, the controller 50 determines that the predetermined condition is satisfied and proceeds to step S103 as a result of this determination. Otherwise, the controller 50 repeats step S101.

At step S103, the controller 50 engages one or both of the pinion gears P1 and P2 based on the received control inputs (arrow 11). Step S103 may entail transmitting control signals (arrow 111) to one of more of the solenoid devices S1, S2, S3, S4, or S5 described hereinabove to cause a translation of pinion gears P1 and P2 along the third axis A₃ to selectively engage a respective one of the first and second gear elements 44 and 54. The identity of the solenoid devices being controlled will depend on the embodiment, e.g., solenoid devices S1 and S2 of FIG. 2A, solenoid device S3 of FIG. 2B, or coaxially arranged solenoid devices S4 and S5 of FIG. 5. As explained above, the solenoid devices may be fired or activated simultaneously or one before the other, if the design allows for sequential firing, to preload the engine 14 or MGU 28 of FIG. 1. The method 100 then proceeds to step S105 after first determining at step S104 that the first and/or second gear elements 44 and/or 54 have been engaged.

Step S105 includes executing a control action (EXEC CA) with respect to the system that uses the actuator assembly 40. In keeping with the above example of an engine start event, step S105 may entail transmitting control signals to the MGU 28 to commence cranking and starting of the engine. Depending on which pinion gear P1 or P2 is engaged with its target gear element, i.e., first gear element 44 and second gear element 54 of FIG. 1, the nature of the control action may vary from a geared engine start via the first gear element 44 and a belt-assisted start via the belted drive system 30. Step S105 concludes when the pinion gears P1 and P2 passively disengage from a respective one of the first and second gear elements 44 and 54 when a speed of the crankshaft 16 exceeds a speed of the MGU 28. The term "passively" as used here means that disengagement occurs automatically by virtue of the structure and operation of the overrunning clutches 75, as opposed to by affirmatively commanding disengagement via a control signal. That is, overrunning clutches such as the overrunning clutches 75 hold torque in only one direction and freewheel in the other direction, as is well known in the art of such devices. Such overrunning/freewheeling devices may be embodied as sawtoothed, spring-loaded discs or ratchets, spring-loaded steel rollers disposed inside of a driven cylinder, or the like. Once completion of the engine start event is detected, the linear actuators 33, e.g., the solenoid devices S1, S2, S3, S4 or S5, are de-energized.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A hybrid powertrain comprising:
   an engine having a crankshaft, a flywheel connected to and rotatable via the crankshaft, and a first gear element that rotates in conjunction with the flywheel about a first axis;
   a motor-generator unit (MGU) having a rotor shaft that is rotatable about a second axis that is parallel to the first axis, and a second gear element connected to the rotor shaft;
   a selective coupling device disposed between the crankshaft and the MGU;
   a belted drive assembly having a first pulley connected to the crankshaft, a second pulley connected to the rotor shaft, and an endless rotatable drive element that connects the first and second pulleys, wherein an engagement of the selective coupling device delivers motor torque from the MGU to the crankshaft;
a transmission operably connected to the engine via an input clutch;
a mechatronic actuator assembly disposed between the first and second gear elements, and having a third axis that is parallel to the first and second axes, at least one linear actuator, a pair of pinion gears translatable along the third axis to selectively engage a respective one of the first and second gear elements, and a first overrunning clutch configured to passively disengage one of the pinion gears from the first gear element when a speed of the crankshaft exceeds a speed of the MGU; and
a controller programmed to process a set of control inputs to thereby determine a required control state of the powertrain, and to transmit control signals to the MGU and the at least one linear actuator to thereby command execution of the required control state via translation of at least one of the pinion gears along the third axis.

2. The hybrid powertrain of claim 1, wherein the mechatronic actuator assembly also includes a second overrunning clutch configured to disengage the other pinion gear of the pair of pinion gears from the second gear element when the speed of the crankshaft exceeds the speed of the MGU.

3. The hybrid powertrain of claim 1, wherein the at least one linear actuator includes a pair of linear actuators arranged on a respective fourth and fifth axis.

4. The hybrid powertrain of claim 1, wherein the at least one linear actuator includes a pair of linear actuators coaxially arranged on a fourth axis.

5. The hybrid powertrain of claim 1, wherein the at least one linear actuator includes a single linear actuator arranged on a fourth axis that is parallel to the third axis.

6. The hybrid powertrain of claim 1, wherein the at least one linear actuator is selected from the group consisting of a solenoid device, a rotary ball screw device, and a shape-memory alloy device.

7. The hybrid powertrain of claim 1, wherein each of the at least one linear actuators includes a plunger that translates toward the first gear element along a fourth axis when the at least one linear actuator is activated, and the actuator assembly includes a plurality of lever forks, at least one of which is operatively connected to the plunger to transmit an axial force to the pinion gears along the third axis when the plunger translates toward the first gear element.

8. The hybrid powertrain of claim 1, further comprising a free plunger having two distal ends, wherein the two distal ends are each engaged by a different one of the plurality of lever forks.

9. The hybrid powertrain of claim 1, wherein the pinion gear that is engagable with the second gear element is nested within a larger gear element to form a matched gear.

10. A mechatronic actuator assembly for a system having a first gear element rotatable about a first axis and a second gear element rotatable about a second axis, the mechatronic actuator assembly comprising:
at least one linear actuator responsive to a set of control signals from a controller to generate an axial force;
a pair of pinion gears that are translatable along a third axis that is parallel to the first and second axes in response to the axial force from the at least one linear actuator, wherein translation of the pair of pinion gears along the third axis results in engagement by the pair of pinion gears of a respective one of the first and second gear elements; and
a first overrunning clutch configured to passively disengage one of the pair of pinion gears from the first gear element when a speed of the first gear element exceeds a speed of the second gear element.

11. The actuator assembly of claim 10, further comprising a second overrunning clutch configured to passively disengage the other pinion gear of the pair of pinion gears from the second gear element when a speed of the first gear element exceeds a speed of the second gear element.

12. The actuator assembly of claim 10, wherein the second gear element is connected to and driven by a motor/generator unit (MGU), the actuator assembly further comprising a controller programmed to process control inputs to thereby determine a control state of the actuator assembly, and to transmit control signals to the MGU and the at least one linear actuator to thereby command execution of the determined control state via translation of at least one of the pinion gears along the third axis.

13. The actuator assembly of claim 10, wherein the at least one linear actuator is a single linear actuator arranged on a fourth axis that is parallel to the first, second, and third axes.

14. The actuator assembly of claim 10, wherein the at least one linear actuator is a pair of linear actuators arranged on a respective fourth and fifth axis.

15. The actuator assembly of claim 10, wherein each of the at least one linear actuators includes a plunger that translates toward the first gear element along a fourth axis that is parallel to the first, second, and third axes when the at least one linear actuator is activated, and the actuator assembly includes a plurality of lever forks at least one of which is operatively connected to the plunger to transmit an axial force to the pinion gears along the third axis when the plunger translates toward the first gear element.

16. The actuator assembly of claim 10, further comprising a free plunger having two distal ends, wherein the two distal ends are each engaged by a different one of the plurality of lever forks.

17. The actuator assembly of claim 10, wherein the pinion gear that is engagable with the second gear element is nested within a larger gear element to form a matched gear.

18. A method for control of a mechatronic actuator assembly aboard a vehicle having a hybrid powertrain that includes an engine with a crankshaft, a flywheel connected to and rotatable via the crankshaft, a first gear element that rotates in conjunction with the flywheel about a first axis, and a motor-generator unit (MGU) having a rotor shaft that is rotatable about a second axis that is parallel to the first axis and a second gear element connected to the rotor shaft, and a belted drive assembly having a first pulley connected to the crankshaft, a second pulley connected to the rotor shaft, and an endless rotatable drive element that connects the first and second pulleys to thereby deliver motor torque from the MGU to the crankshaft, the method comprising:
providing the mechatronic actuator assembly between the first and second gear elements, wherein the mechatronic actuator assembly includes at least one linear actuator;
receiving, via a controller, a set of control inputs;
determining if the set of control inputs is indicative of a required control state of the powertrain in which there is a need to start the engine via the MGU in either a belt-assisted start via the first and second pulleys and the second gear element via engagement a selective coupling device disposed between the crankshaft and the MGU, or a geared start via the first gear element;

energizing the least one linear actuator to thereby generate an axial force along a third axis that is parallel to the first and second axes;

translating, via the axial force, a pair of pinion gears along the third axis to selectively engage a respective one of the first and second gear elements when the set of control inputs is indicative of the need to start the engine, including transmitting a control signal to the at least one linear actuator to cause the translating of the pinion gears to occur; and passively disengaging the pair of pinion gears from a respective one of the first and second gear elements via at least one overrunning clutch when a speed of the crankshaft exceeds a speed of the MGU.

19. The method of claim 18, wherein transmitting a control signal to at least one linear actuator includes transmitting the control signal to a single linear actuator arranged on a fourth axis.

20. The method of claim 18, wherein transmitting a control signal to at least one linear actuator includes transmitting the control signal to a pair of linear actuators arranged on a respective fourth and fifth axis.

* * * * *